United States Patent
Almesåker et al.

(10) Patent No.: US 6,959,402 B1
(45) Date of Patent: Oct. 25, 2005

(54) COMPUTER DEVICE WITH A SAFETY FUNCTION

(75) Inventors: Marieanne Almesåker, Linkoping (SE); Bengt Nystrom, Linkoping (SE)

(73) Assignee: SAAB AB, Linköping (SE)

( * ) Notice: Subject to any disclaimer, the term of this patent is extended or adjusted under 35 U.S.C. 154(b) by 396 days.

(21) Appl. No.: 10/088,691

(22) PCT Filed: Sep. 22, 2000

(86) PCT No.: PCT/SE00/01847

§ 371 (c)(1),
(2), (4) Date: Jun. 10, 2002

(87) PCT Pub. No.: WO01/22220

PCT Pub. Date: Mar. 29, 2001

(30) Foreign Application Priority Data

Sep. 22, 1999 (SE) .................................. 9903422

(51) Int. Cl.⁷ ............................................. G06F 11/00
(52) U.S. Cl. ....................................................... 714/23
(58) Field of Search .......................................... 714/23

(56) References Cited

U.S. PATENT DOCUMENTS

| | | | |
|---|---|---|---|
| 4,491,914 A | 1/1985 | Sujaku | |
| 4,751,670 A * | 6/1988 | Hess | 701/14 |
| 4,763,296 A | 8/1988 | Gercekei | |
| 5,247,659 A | 9/1993 | Curran et al. | |
| 5,333,285 A * | 7/1994 | Drerup | 714/23 |
| 5,432,927 A | 7/1995 | Grote et al. | |
| 5,596,711 A * | 1/1997 | Burckhartt et al. | 714/23 |
| 6,141,771 A * | 10/2000 | O'Brien et al. | 714/15 |
| 6,351,824 B1 * | 2/2002 | Singh | 714/23 |
| 6,393,589 B1 * | 5/2002 | Smit et al. | 714/55 |
| 6,539,472 B1 * | 3/2003 | Fujishima | 713/2 |

FOREIGN PATENT DOCUMENTS

| | | |
|---|---|---|
| EP | 0265366 | 4/1988 |
| EP | 0481508 | 4/1992 |
| WO | 99/08186 | 2/1999 |

* cited by examiner

Primary Examiner—Bryce P. Bonzo
(74) Attorney, Agent, or Firm—Swidler Berlin LLP

(57) ABSTRACT

The invention concerns a computer device with a safety function in order to avoid non-necessary disconnection of the computer device. The computer device comprises processor means (10), an ordinary member unit (12), a supervisory unit (14) and a further member unit (16). The computer device is arranged such that the processor means (10) at a restart generated by a restart signal, is connected to the further memory unit (16) and reads and executes the instructions that are stored in the same, while the ordinary memory unit (12) is disconnected from the processor means (10).

14 Claims, 1 Drawing Sheet

COMPUTER DEVICE WITH A SAFETY FUNCTION

BACKGROUND OF THE INVENTION AND PRIOR ART

Figure 1:
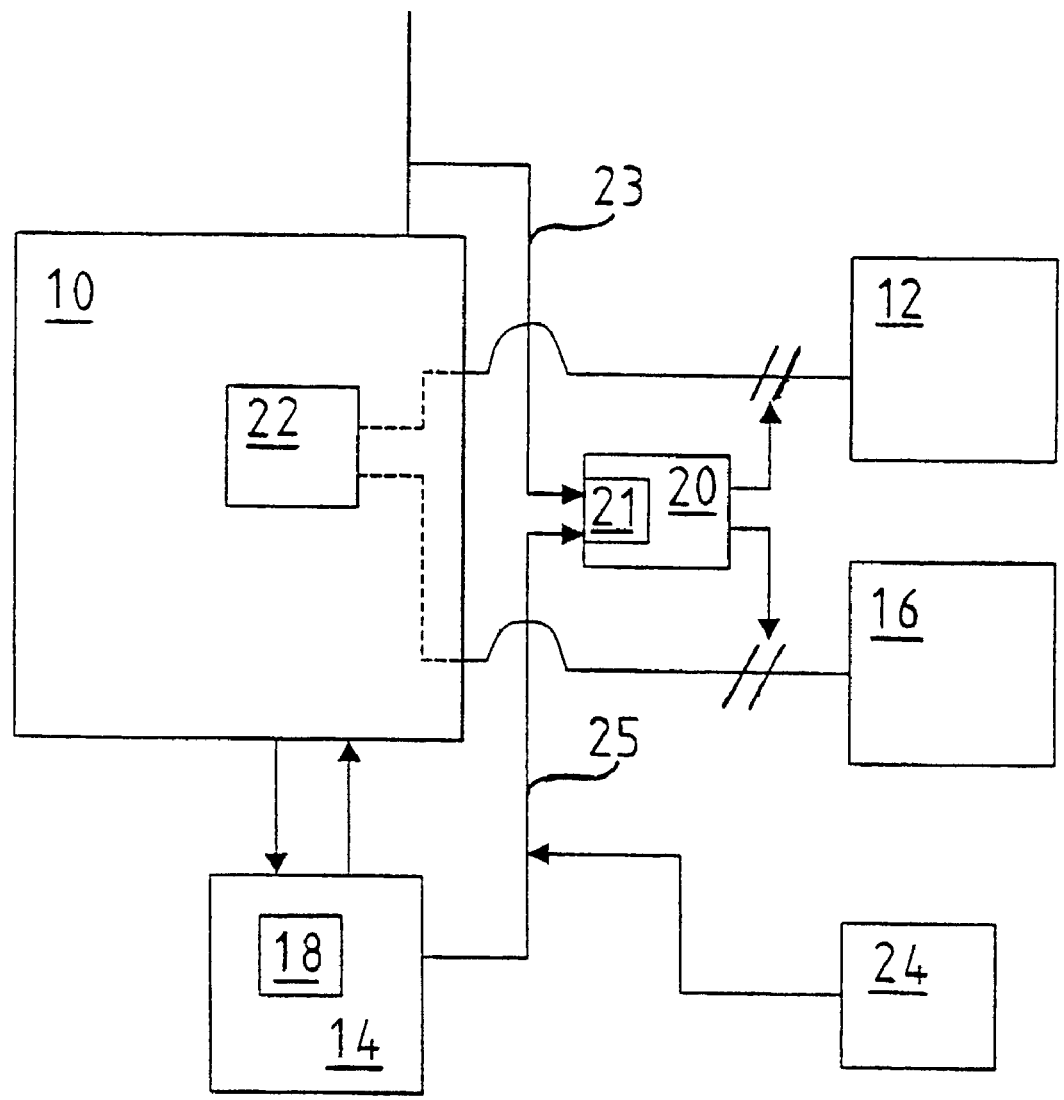

The present invention concerns a computer device with a safety function for avoiding non-necessary disconnection of the computer device, comprising processor means, an ordinary memory unit connected to said processor means and arranged to comprise at least one program that is executed by the processor means, a supervisory unit that supervises the function of the computer device and that is arranged to, in case an error occurs, send a restart signal or a stop signal to the processor means.

Such computer devices are already known. The supervisory unit may for instance constitute a so-called "watchdog timer". U.S. Pat. No. 4,763,296 describes the function of such a watchdog timer. Such a device thus has a timer that continuously is in operation when the computer device is used. If the timer reaches a predetermined value, i.e. if a predetermined time has elapsed, the watchdog timer generates a restart signal that causes a restart (reset) of the computer device. During normal use, the timer is set to zero at regular intervals by the normal program execution by the processor. In case an error occurs, for example if the computer executes an infinite subroutine, the timer will not be set to zero and the watchdog timer thus causes a restart of the system.

Also other kinds of computer devices with safety functions are already known. EP-A-481 508 thus describes a device that comprises a backup memory. When the current supply to the computer device is shut off, the status of the central processor and the content in a main memory are transferred to said backup memory. When then the computer device is started once again by again connecting the current supply, that which is stored in the backup memory will be restored.

EP-A-265 366 describes a computer device that comprises a primary memory and a backup memory. Switching from the primary memory to the backup memory is done by means of a "Backup Control System Transfer Mechanism". This mechanism is relatively complicated. At the generation of a power-on-reset signal, said mechanism secures that restart is done from the primary memory (see column 6, lines 21–28).

There exists a need to improve the safety function of a computer device. There is thus a need of in a safe manner restarting the computer device when an error has been detected. Such an error that may cause errors in the operation of the computer is for example memory errors that may occur in the memory where programs that are executed in the computer device are stored. An error may also be caused by the software that is stored in the memory of the computer device. Such errors may for example occur when new software is used that has not been completely tested. Furthermore, there exists a need to secure the function of the computer device by relatively simple means. A further problem is to secure at least certain basic functions of the computer device when different errors occur.

SUMMARY OF THE INVENTION

The purpose of the present invention is to achieve a computer device with a reliable safety function that, furthermore, is achieved by relatively simple means.

This purpose is achieved by the initially defined computer device that is characterised by a further memory unit that is arranged to comprise at least some basic system instructions, wherein the computer device is arranged such that the processor means, at a restart generated by said restart signal from the supervisory unit, is connected to the further memory unit and reads and executes instructions that are stored in the same, while the ordinary memory unit is disconnected from the processor means.

By the fact that the processor means is connected to the further memory unit when a restart signal has been generated by the supervisory unit, it is avoided that possible errors that are present in the instructions that are stored in the ordinary memory unit are transferred to the processor means. A safer function of the computer device after that a restart signal has been generated in response to a detected error is thereby achieved. In this context it should be noted that when in the claims and in the description it is mentioned that a memory unit is connected to or is disconnected from the processor means, it is thereby not necessarily meant that the disconnection is done by physically breaking the connection between the processor means and the memory unit in question. The concepts connect to and disconnect thus comprise two possibilities: physical switching by breaking the connection, and the connection to and the disconnection from at a program level.

It should be noted that by the concept "system instructions" is in this application preferably, but not necessarily, meant programs that control a system or a part of a system that is controlled by the computer device, i.e. the concept "system instructions" concerns application instructions.

According to an embodiment of the invention, the ordinary memory unit and the further memory unit constitute two different, physically separate, memories. By this feature an increased security is achieved since the ordinary memory unit is arranged as a separate memory that is completely disconnected from the processor means at a restart.

According to an alternative embodiment of the invention, the ordinary memory unit and the further memory unit constitute two parts of physically the same memory, but with different memory addresses. Through this construction fewer memory components are needed since the further memory unit is stored as a special part of the memory where also the ordinary memory unit is included.

According to a further embodiment of the invention, said supervisory unit is arranged to generate a signal in dependence of a timer in such a manner that said restart signal is generated if no trigger signal that sets the timer to zero is received within a predetermined time interval. The supervisory unit may in this case thus constitute a so-called watchdog timer (WDT). Such a WDT often forms part of computer devices. Such a well functioning and already existing WDT may thus be used as a supervisory unit in the device according to the present invention. It should however be noted that also other kinds of supervisory units than a WDT may be used in the computer device according to the invention.

According to still another embodiment of the invention, the computer device comprises a memory safety circuit that is arranged to stop the reading from the ordinary memory unit and to connect for reading from said further memory unit when both said restart signal and a signal indicating applied supply voltage is the case. Such a memory safety circuit is a relatively simple and well functioning circuit that controls that switching from the ordinary to the further memory unit takes place. Furthermore, this memory safety circuit secures that such a switching only occurs if supply voltage to the computer device is present.

According to a further embodiment of the invention, said further memory unit is arranged such that it comprises basic system instructions with a high degree of reliability. The further memory unit may hereby be arranged to comprise system instructions that have already been thoroughly tested and that therefore have a high functional reliability. The further memory unit may hereby also be provided with the basic system instructions for the computer device while non-necessary system instructions have been excluded from said further memory unit.

According to still another embodiment of the invention, said further memory unit is arranged such that it comprises system instructions with a degree of reliability that is higher than the degree of reliability that is the case in the ordinary memory unit. The ordinary memory unit may thus comprises system instructions that have not been so thoroughly tested in the computer device. The further memory unit may thereby comprise the basic system instructions that have already been shown to have a high reliability. Within the frame of the invention is of course also the possibility that the ordinary memory unit and the further memory unit comprise system instructions with the same degree of reliability.

According to a further embodiment of the invention, at least said further memory unit is a non-volatile memory. This fact contributes to an increased functional reliability of the computer device.

According to still another embodiment of the invention, said processor means comprises a working memory that is arranged such that at a restart of the computer device this working memory is reset before reading from said further memory unit is started. By this feature is secured that instructions that may comprise errors and that originate from the ordinary memory unit do not maintain in the working memory before reading from the further memory unit is started.

According to a further embodiment of the invention, said further memory unit is arranged to be write protected at least when the computer device is in operation. This fact contributes to further safety since the content in this further memory unit is protected and may not be modified when the computer device is in operation.

According to still another embodiment of the invention, the computer device is arranged such that if said restart signal has been generated a predetermined number of times, then, in case an error occurs again, said stop signal is generated. This means that the supervisory unit generates a predetermined number of restart signals. If it happens that an error is the case even after that a predetermined number of restart attempts have been made, the computer device is stopped.

According to still another embodiment of the invention, the computer device comprises a switching member for manually generating said restart signal. This means that in addition to automatic generation of a restart signal by the supervisory unit, also a manual restart signal may be generated by an operator. An operator may thus order that a restart from the further memory unit is to take place.

A further embodiment of the invention is clear from claim 13. This embodiment may also be combined with the features of one or more of the claims 2–12.

The purpose of the invention is also achieved by a method according to claim 14. This method has advantages corresponding to those described in connection with the device.

The method according to claim 14 may also be combined with features corresponding to those defined in one or more of the claims 2–12.

A preferred use of the computer device is to use it to control a system that is included in different vehicles, for example in aircrafts. An aircraft has many different functions that are controlled by a computer device. It is important that these functions function and that unnecessary disconnection of the computer device or of its operation concerning some application is avoided. This aim is achieved by a use according to claim 15.

SHORT DESCRIPTION OF THE DRAWING

The present invention will now be explained by means of a described embodiment, which constitutes an example of the invention, and with reference to the annexed drawing.

FIG. 1 shows schematically a block diagram of an embodiment of the invention.

DETAILED DESCRIPTION OF AN EMBODIMENT OF THE INVENTION

FIG. 1 shows a block diagram of an embodiment of the invention. The computer device comprises a processor means 10. With this processor means 10 is meant not only the central processor unit (CPU) of the computer device but also other central parts of the computer device such as for example the working memory 22. The computer device also comprises an ordinary memory unit 12. This ordinary memory unit 12 may for example constitute some kind of PROM, for example UVPROM, EEPROM or the like. When the computer device first is started, the processor means 10 is connected to the ordinary memory unit 12. This ordinary memory unit 12 is thus arranged to comprise the instructions that control the operation of the computer device. The computer device also comprises a supervisory unit 14. The supervisory unit 14 supervises the function of the computer device and is arranged to generate a restart signal or a stop signal to the processor means 10 if the supervisory unit 14 detects an error. The supervisory unit 14 may for example constitute a so-called watchdog timer (WDT). Such a WDT 14 generates a signal that depends on a timer 18. A restart signal is thereby generated if the WDT 14 within a predetermined time interval does not receive a trigger-signal that sets the timer 18 to zero. In order to have a high reliability, the WDT 14 comprises suitably its own timer 18. It is however possible that the timer function of the WDT 14 is controlled by the same clock that is included in the processor means 10.

The computer device also comprises a further memory unit 16. This further memory unit 16 is arranged to comprise at least some basic system instructions. The further memory unit 16 may constitute a memory that is physically separated from the ordinary memory unit 12. It is also possible that the ordinary memory unit 12 and the further memory unit 16 constitute two parts of physically the same memory. In order to further increase the reliability in case a memory error should occur, the ordinary memory unit 12 and the further memory unit 16 may constitute physically separate memories of different kinds, for example from different manufacturers. The further memory unit suitably constitutes some kind of PROM, for example UVPROM or EEPROM.

The computer device also comprises a memory safety circuit 20. This memory safety circuit 20 may form a part of the processor means 10. In the shown embodiment, the memory safety circuit 20 however constitutes a separate circuit. The memory safety circuit 20 comprises an AND-gate 21. The memory safety circuit 20 controls which of the ordinary memory unit 12 and the further memory unit 16 that is to be connected to the processor means 10. This control may either be formed by opening or closing the electric connection between the respective memory unit 12, 16 and the processor means 10 or also be formed by a control on a program level of these connections. It is also possible that the control is done by a combination of software instructions and physically opening or closing. One input of the AND-gate is connected to a line 23 that indicates that a supply voltage is present. The other input of the AND-gate 21 is connected to a line 25 that is connected to the WDT 14. Via this line 25, a restart signal generated by the WDT 14 is lead to the AND-gate 21 and thereby to the memory safety circuit 20.

The computer device also comprises a switching member 24 for manually generating a restart signal. This switching member 24 may suitably be connected to the input of the AND-gate that is also connected to the WDT 14.

The WDT 14 thus supervises the function of the computer device. When the computer device functions normally, the WDT 14 receives at regular intervals a trigger-signal from the processor means 10. This trigger-signal sets the timer 18 to zero. The WDT 14 does thereby not generate any restart signal to the line 25. If, however, an error occurs such that the WDT 14 does not receive any trigger-signal from the processor means 10 within a predetermined time interval, the WDT 14 generates a restart signal. This restart signal is thus lead to one of the inputs of the AND-gate 21. When the AND-gate 21 receives such a restart signal, and if at the same time the other input of the AND-gate 21 detects that a supply voltage is the case, the memory safety circuit 20 controls that the ordinary memory unit 12 is disconnected from the processor means 10 and that the further memory unit 16 is connected to the processor means 10. Also the processor means 10 receives a signal, suitably from the WDT 14, that a restart is to be performed. The working memory 22 of the processor means 10 is thereby reset, whereafter reading from the further memory unit 16 takes place. The reading is thereby done to predetermined addresses of the working memory 22. The processor means 10 thus reads and executes the instructions that are stored in the further memory unit 16.

It is conceivable that a restart attempt fails and that the WDT 14 thus generates a new restart signal. If again an error is detected, further restart signals may be generated by the WDT 14. The computer device is thereby suitably arranged such that when a predetermined number of restart attempts have been made, the restart attempts are stopped. A warning function may thereby be generated by the computer device and the latest information concerning the status of the processor means 10 and the memory units 12, 16 may be registered for later analysis. The computer device is suitably arranged such that the restart attempts are stopped after for example one to four restart attempts, preferably after two restart attempts. The computer device may thereby be arranged such that the restart attempts are stopped if said predetermined number of restart attempts have been performed within a predetermined time interval.

In order to increase the safety, the further memory unit 16 is suitably arranged such that it is write protected when the computer device is in operation. Furthermore, suitably the ordinary memory unit 12 as well as the further memory unit 16 constitute non-volatile memories.

The further memory unit 16 is suitably arranged such that it comprises basic system instructions with a high degree of reliability. The further memory unit 16 may thereby comprise primary and well-tested system functions. Suitably, the further memory unit 16 is arranged such that it thereby comprises system instructions with a higher degree of reliability than the system instructions that are present in the ordinary memory unit 12. By the expression "degree of reliability" may hereby for example be meant the software safety levels that are defined according to RTCA-standard document NO.RTCA/DO-178B.

The computer device according to the invention may preferably be arranged to secure the normal function of the computer device under the execution of an application program even when an error occurs that otherwise would lead to a disconnection and a shut-off of the computer device, or at least to the interruption of the execution of the application program in question. The ordinary memory unit 12 thus comprises an application program that is executed by the processor means 10. In case an error occurs in the execution of at least said application program, the processor means 10 is connected to the further memory unit 16 that is arranged to comprise at least some basic, already used and safe application instructions. The computer device is thus arranged such that the execution of the application that is controlled by the application program may continue on the basis of the application instructions that are retrieved from the further memory unit.

According to a method according to the invention, if an error occurs, a connection to the further memory unit 16 that comprises at least some basic application instructions takes place. The execution of the application that is controlled by an application program may thereby continue on the basis of the application instructions that are retrieved from the further memory unit and that are read in a normal and traditional manner into the processor means 10 with a normal reset of the working memory 22.

The computer device according to the invention may also advantageously be used to control a system that is included in an aircraft.

The present invention is not limited to the shown embodiment but may be varied and modified within the scope of the following claims.

What is claimed is:

1. A computer device with a safety function for avoiding non necessary disconnection of the computer device, comprising processor means;

an ordinary memory unit connected to said processor means and arranged to store at least one application program that is executed by the processor means;

a supervisory unit that supervises the function of the computer device and that is arranged to, in case an error occurs, send a restart signal or a stop signal to the processor means, characterised by a further memory unit that is arranged to store at least some basic instructions in the form of instructions of the at least one application program that control a system or a part of a system that is controlled by the computer device, wherein the computer device is arranged such that the processor means, at a restart generated by said restart signal from the supervisory unit is connected to the further memory unit and reads and executes the basic instructions that are stored in the same, while the ordinary memory unit is disconnected from the processor means, and wherein said further memory unit is arranged to be write protected at least when the computer device is in operation.

2. A computer device according to claim 1, wherein the ordinary memory unit and the further memory unit constitute two different, physically separate memories.

3. A computer device according to claim 1, wherein the ordinary memory unit and the further memory unit constitute two parts of physically the same memory, but with different memory addresses.

4. A computer device according to claim 1, wherein in said supervisory unit is arranged to generate a signal in dependence of a timer in such a manner that said restart signal is generated if no trigger-signal signal that sets the timer to zero is received within a predetermined time interval.

5. A computer device according to claim 1, comprising a memory safety circuit that is arranged to stop the reading from the ordinary memory unit and to connect for reading from said further memory unit when both said restart signal and a signal indicating applied supply voltage is the case.

6. A computer device according to claim 1, wherein said further memory unit is arranged such that it stores the basic instructions with a high degree of reliability.

7. A computer device according to claim 1, wherein said further memory unit is arranged such that it stores the basic instructions with a high degree of reliability that is higher than the degree of reliability that is the case in the ordinary memory unit.

8. A computer device according to claim 1, wherein at least said further memory unit is a non-volatile memory.

9. A computer device according to claim 1, wherein said processor means comprises a working memory that is arranged such that at a restart of the computer device this working memory is reset before reading from said further memory unit is started.

10. A computer device according to claim 1, arranged such that if said restart signal has been generated a predetermined number of times, then, in case an error occurs again, said stop signal is generated.

11. A computer device according to claim 1, comprising a switching member for manually generating said restart signal.

12. A computer device arranged to secure the normal function of the computer device, under the execution of at least one application program, when an error occurs that normally leads to disconnection and shut-off of the computer device or at least to disconnection concerning said application program, which computer device comprises processor means, an ordinary memory unit connected to said processor means and arranged to comprise at least said application program that is executed by the processor means, a supervisory unit that supervises the function of the computer device and that is arranged to, in case an error occurs in the execution of at least said application program, send a restart signal or a stop signal to the processor means, characterized by a further memory unit that is arranged to comprise at least some basic instructions for said application program, wherein the computer device is arranged such that when a restart takes place in response to a restart signal generated by the supervisory unit, the processor means is connected to the further memory unit and reads and executes the basic instructions, while the ordinary memory unit is disconnected from the processor means, wherein the computer device is arranged such that the execution of an application that is controlled by said application program may continue on the basis of the basic instructions that are read and executed from the further memory unit, wherein the execution of the application may continue without the necessity for the computer device to be disconnected, and wherein said further memory unit is arranged to be write protected at least when the computer device is in operation.

13. A method for securing the normal function of a computer device, under the execution of at least one application program which controls an application, when an error occurs that normally leads to disconnection and shut-off of the computer device or at least to disconnection concerning said application program, which computer device comprises processor means, an ordinary memory unit connected to said processor means and arranged to comprise at least said application program that is executed by the processor means, a supervisory unit that supervises the function of the computer device and that is arranged to, in case an error occurs in the execution of at least said application program, send a restart signal or a stop signal to the processor means, a further memory unit that is arranged to comprise at least some basic instructions for said application, wherein said further memory unit is arranged to be write protected at least when the computer device is in operation, which method comprises that when a restart takes place in response to a restart signal generated by the supervisory unit, the processor means is connected to the further memory unit and reads and executes the basic instructions, while the ordinary memory unit is disconnected from the processor means, wherein the execution of the application that is controlled by said application program may continue on the basis of the basic instructions that are read and executed from the further memory unit such that the execution of the application in question may continue with out the necessity for the computer device to be disconnected.

14. A method according to claim 13, for controlling a system that is included in an aircraft.

* * * * *